United States Patent

[11] 3,579,790

[72] Inventor Paul M. D'Amico
 2709 S. 12th St., Philadelphia, Pa. 19146
[21] Appl. No. 772,179
[22] Filed Oct. 31, 1968
 Division of Ser. No. 502,048, Oct. 22, 1965, abandoned.
[45] Patented May 25, 1971

[54] DEVICES AND ACCESSORIES FOR ELECTRIC ARMORED CABLES AND STUFFING TUBES
 3 Claims, 13 Drawing Figs.
[52] U.S. Cl. ..................................................... 29/203
[51] Int. Cl. ........................................................ H05k 13/00
[50] Field of Search ............................................ 29/203, 203
 (H), 33, 203 (DT), 203 (D), 203 (DTS);
 30/90.1—90.8; 81/9.5; 285/161

[56] References Cited
UNITED STATES PATENTS
2,450,883 10/1948 D'Amico ........................ 285/161

| 2,526,717 | 10/1950 | Weisberg | 29/203(X) |
| 3,114,277 | 12/1963 | Clendenin | 30/90.1 |
| 3,130,493 | 4/1964 | Scudieri | 81/9.5 |
| 3,246,381 | 4/1966 | Etchison, Jr. et al. | 29/33 |
| 3,264,860 | 8/1966 | Herb | 29/203 |
| 3,319,324 | 5/1967 | Keller | 29/203 |
| 3,376,627 | 4/1968 | Sitz | 29/203 |
| 3,484,921 | 12/1969 | Ziegler, Jr. | 29/203 |

Primary Examiner—Thomas H. Eager

ABSTRACT: Devices and accessories in the form of tool means and associated equipment for the installing and servicing, including emergencywise preparation, of electric armored cables, in the form of a circular T-w wrench, a safety shield with accurate cutter grooves in a combined ring-cutter, which limits the depth in cutting the outer interstices of shielding or layers of insulation if required, and said devices also may be affixed and grouped into a piece unit for storing and ever-ready utility.

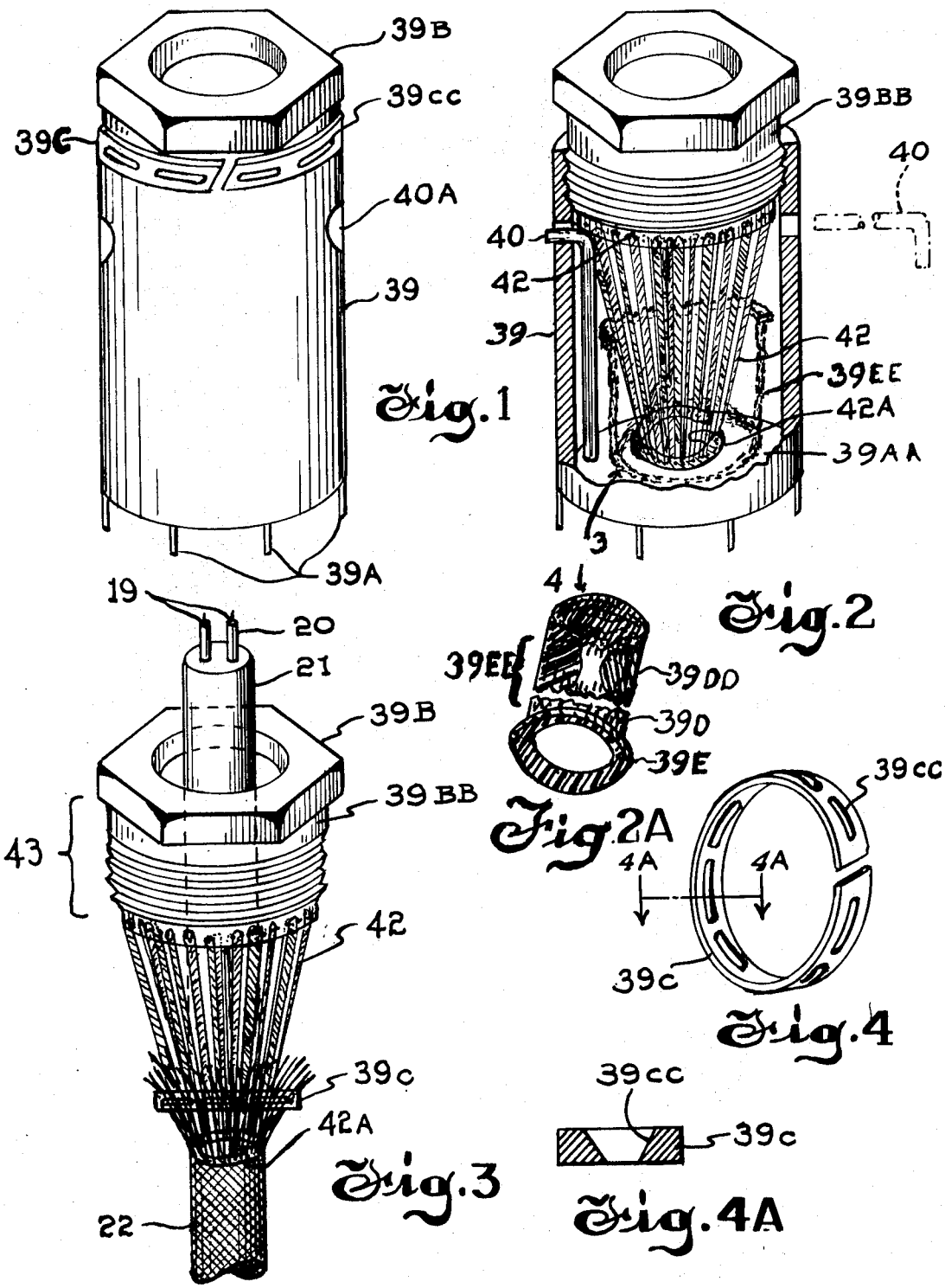

INVENTOR
Paul M. D'Amico

DEVICES AND ACCESSORIES FOR ELECTRIC ARMORED CABLES AND STUFFING TUBES

This application is a division of my copending application Ser. No. 502,048, filed Oct. 22, 1965, now abandoned.

Tool means and accessories for preparing and servicing of electric armored cables as widely used in both marine and field areas when making rigidly specified connections are some of the many problems as described in the former patent granted to me on Oct. 12, 1948, being U.S. Pat. No. 2,450,883, and also described in my abandoned application Ser. No. 502,048, filed Oct. 22, 1965, entitled Stuffing Tubes and Stuffing Tubes Universal, respectively.

BRIEF DESCRIPTION

The invention relates to useful tool means and devices or fittings for the useful purpose of dressing, preparing, and assembling armored electric cables into stuffing tubes, and for meeting standards and requirements in termination, sealing and locking devices.

DETAILED DESCRIPTION

Figure 5:
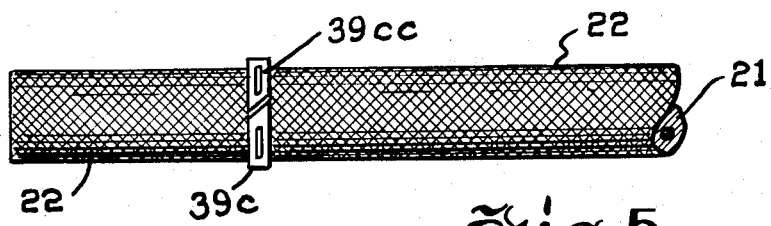
Figure 6:
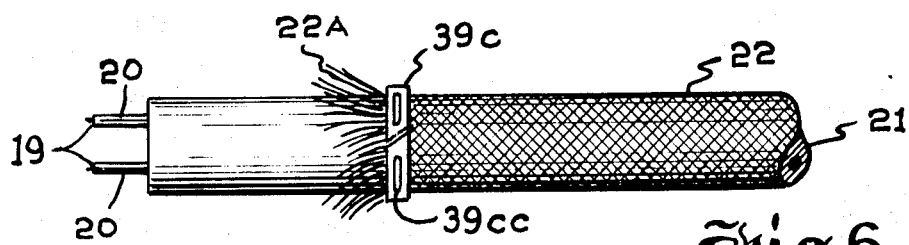
Figure 7:
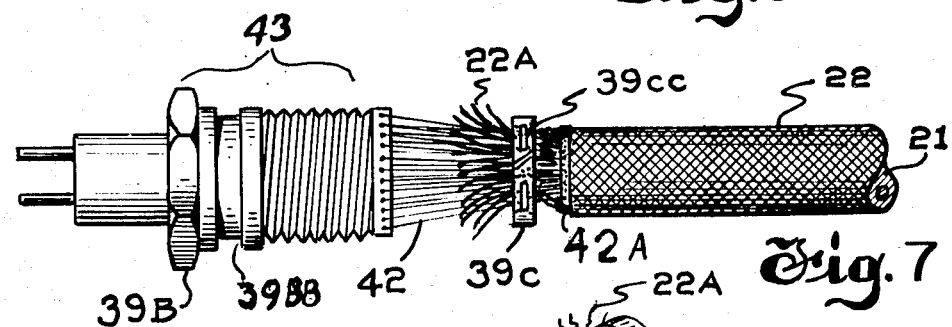
Figure 8:
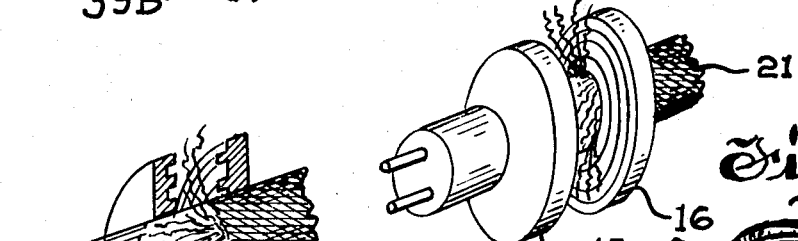
Figures 9, 9A:
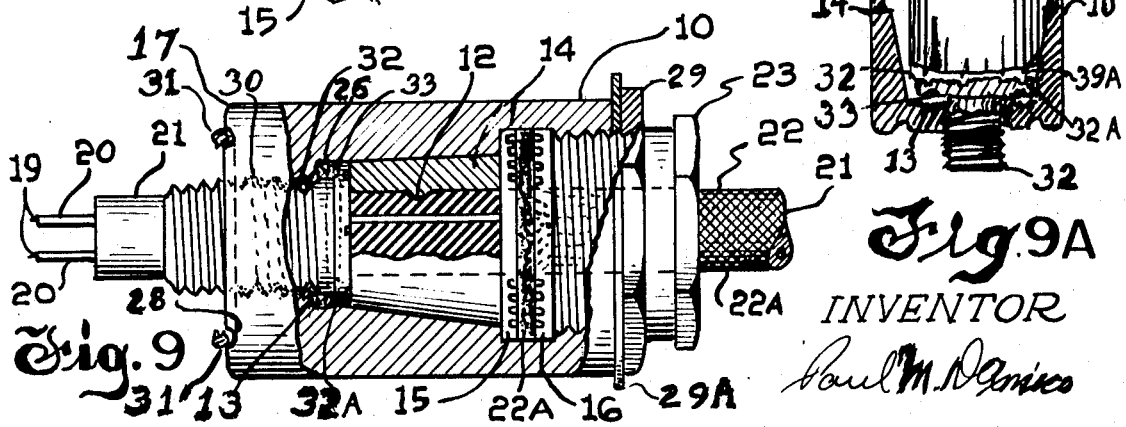

The inventions, further outlined, are in the construction of devices and accessories as well as associated equipment, which take the form of combination tool means with added new and useful features in an assembled enclosure containing storing and sealing facilities. A circular tee wrench with spanner pins at its base is applied to a related threaded bushing and combined with a safety shield-ring cutter and a top hat cable end seal for the end usage of armored electric cables and the preparation in dressing for installing and servicing thereof, which will be further understood from the following description and drawings:

FIG. 1 is a view in side elevation, which illustrates a completely assembled and enclosed tool means, being a circular tee wrench with added fittings, when stored or in ever-ready position as a utility when required, and FIG. 2 is a view in side elevation, with a portion cut away for clarity of illustration, showing additional tool means and accessories within its compartment, with the inclusion of a upper spaced cavity which also stores a slideable cutter-ring which is shown mounted in FIG. 1, and FIG. 2A is a fragmentary exploded view of a new and useful cable end seal, with portions cut away for clarity of illustration, in unlimited length and ring-formed base for insertion between interlocking gland ring assemblies as is shown in D'Amico's old or new applications entitled Stuffing Tubes. Said seal is also termed a top hat cable end seal and is in reality a prepack, and FIG. 3 is a side elevational view illustrating another tool means being a safety shield combining stavelike fingers to wraparound base for folding underneath cable armor interstices being prepared for trimming with cutter-ring in ever-ready position, and FIG. 4 is a side elevational view illustrating slideable ring cutter with calibrated grooves having the proper depth as would be used with either hacksaw or electrician's knife and would be useful for cable armor interstices, or additional layers of insulation if so desired when setting aside each severed layer, and FIG. 4A is a sectional view to indicate said cutter-ring groove to place emphasis on limiting the cutting of said layers, and FIG. 5 is a view in side elevation illustrating an armored electric cable about to be prepared for cutting of said interstices with said cutter-ring in position, and FIG. 6 is a side elevational view with said cutter-ring in position, and an exploded view of said cable interstices about to be accurately trimmed for said cable dressing, and FIG. 7 is a side elevational view, illustrating said safety-shield snugly placed in position underneath said armor with cutter-ring overlapped for said trimming purposes, and FIG. 8 is a fragmentary view, with portions cut away for clarity of illustration to indicate actual positioning of said interstices as being placed relatively, and FIG. 8A is a fragmentary view of combined and modified interlocking gland ring arrangement with said interstices flared and purposely wrinkled with male and female features thereof, and FIG. 9 is a side elevational view with a portion cut away for clarity of illustration, showing complete assembly of a stuffing tube, as shown in my abandoned application, and FIG. 9A is a side elevational view, with a portion cut away for clarity of illustration, which shows a "circular tee wrench" positioning a threaded bushing snugly into lower innards of said tube base, with handle also in position to thus aid in said operational features, and FIG. 9A also indicates their relationship.

A preferred embodiment of these inventions so interrelated and combined is illustrated in FIG. 1 wherein the reference numeral 39 denotes a circular body having spanner pins 39A, and at its upper portion holes 40A are provided for positioning handle 40 which is also upperly followed by and in stored position a cutter-ring 39C with its special grooves 39CC, above which is located the handgrip of safety-shield 42. Said handgrip as a part thereof is numbered 39B. FIG. 2 shows the device or tool-means 39 as completely storing in its cavity a key-handle 40, and safety-shield 42 with its base piece 42A. An inner storage chamber 39AA stores additionally another important device, fitting or facility in the form of a top hat cable end seal which is indicated by arrows 3 and 4 and numeral 39EE as a one piece unit with no limit as to the length which may be required for varying instances, especially in emergencies which may come about, said length being shown by broken lines in FIG. 2A.

While FIG. 3 shows said safety shield 42 as an entire assembly in relationship with FIGS. 1 and 2 conjunctively indicating the combined sections and parts, such as upper group 43 with handgrip 39B, cutter-ring cavity 39CC, fingered stavelike fan section 42 with its supporting base piece 42A, in position under armor sheath 22 which followed cutter-ring cavity 39C, while at the upper extremity of the cable is an impervious sheath 21 with conductors 19 with insulation 20.

FIG. 4 shows cutter-ring 39C which is slit for slideability as to varying sizes, and calibrated grooves 39CC which limits depth of trimming of interstices or layer of insulation if need be, both arrows 9A in downward position indicate relationship with groove 39CC and said cutter-ring 39C, in FIG. 4A.

FIG. 5 shows armored cable 21 with shield 22 and cutter-ring 39C in first operation, while FIG. 6 shows second operation with said pieces, whereby waste has been discarded. FIG. 7 shows third operation with said safety-shield 42 and handgrip 43 in position conjunctively with cutter-ring ready for accurately trimming said interstices, whereas it must be noted that said stavelike fingers are of hardened materials such as stainless steel also that the cutter-ring is made of hardened materials included in that category and it must also be noted that electrician's knives are not intended to keep and maintain sharp edges, because of possible knicks to cables, and interstices 22A are usually of light materials such as aluminum. FIGS. 8 and 8A show the importance of wrinkled and flared interstices for being properly placed within the grasp of said interlocking rings 15 and 16 which are pressured in place by followup gland nut 23, as shown in FIG. 9 indicating complete assembly of a stuffing tube, which is also shown in FIG. 1 of my abandoned application. Body 10 encases cable 22 with innards 19 being conductors, which are covered with insulation 20, and an impervious sheath 21. The cutaway view in FIG. 9 shows a threaded bushing 32 placed at threaded base 30, a rounded base 17 allowing welding or soldering when used as a bulkhead tube, but when used as a terminal tube seal 31 at cavity 28 is applied for further sealing cavity 33 conjunctively with cavity 13 with seal 26, which is upwardly followed by inner dimpled packer-sealer 12 which surrounds said impervious sheath and periphery. The upper chamber shows a limit-stop 14 followed by gland-rings 15 and 16 with interstices 22A affixed therebetween, and gland nut 23 exerts needed pressure when required. A large locknut 29 and a ring 29A are used for purposes such as in walls or bulkheads. FIG.

9A shows a circular tee wrench 39 positioning a threaded bushing 32 at the tube base extremity with handle 40 in place at holes 40A.

It should be apparent that various modifications and changes can be made in the above disclosed, and described devices and accessories without departing from the spirit and scope thereof as set forth in the appended claims.

What I claim as new and desire to secure by letters patent is:

I claim:

1. Apparatus for assembling electrical components of a sheathed cable and interchangeable terminal, comprising a tubular housing member having a threaded connection with another tubular housing member having a storage area, a handle element for threading the tubular housing members together and stored within the storage area, a cutter-ring element and safety-ring for trimming the ends of the sheath of the cable stored within the storage area, and each of said elements being suitable to facilitate the assembling and securing of said electrical components of said sheathed cable and terminal.

2. Apparatus as set forth in claim 1, wherein an additional element stored is a cable end seal.

3. Apparatus as set forth in claim 1, wherein said cable end seal is in the shape of a top hat.